(12) United States Patent
Kim et al.

(10) Patent No.: US 8,861,838 B2
(45) Date of Patent: Oct. 14, 2014

(54) APPARATUS AND METHOD FOR CORRECTING STEREOSCOPIC IMAGE USING MATCHING INFORMATION

(75) Inventors: Hae Dong Kim, Daejeon (KR); Kyung Ho Jang, Daegu (KR); Jung Jae Yu, Seongnam (KR); Myung Ha Kim, Daejeon (KR); Ho Wook Jang, Daejeon (KR); Seung Woo Nam, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 41 days.

(21) Appl. No.: 13/490,400

(22) Filed: Jun. 6, 2012

(65) Prior Publication Data

US 2013/0089254 A1 Apr. 11, 2013

(30) Foreign Application Priority Data

Oct. 11, 2011 (KR) .................. 10-2011-0103669

(51) Int. Cl.
*G06K 9/00* (2006.01)
*H04N 13/00* (2006.01)

(52) U.S. Cl.
CPC ....... *H04N 13/0033* (2013.01); *H04N 13/0066* (2013.01); *G06K 9/00* (2013.01); *H04N 2013/0074* (2013.01)
USPC ........... 382/154; 382/118; 382/254; 382/285; 382/294; 348/42; 348/43; 348/48; 348/49; 348/218

(58) Field of Classification Search
CPC ..................... G05B 2219/35006; G03B 35/00; G06Q 10/06312; Y10S 707/99945; H04H 60/73; H04N 21/6581; H04N 13/0022; H04N 13/0011; H04N 13/0282; H04N 2013/0081; H04N 13/0003; H04N 13/0029; H04N 2013/0074; G06K 19/077; G06K 9/00214; G06K 9/6212; A61B 3/08; G06T 7/00; G06T 7/0022; G06T 7/2086; G06T 7/002; G06T 2207/10012; G06T 2207/10021
USPC ............ 382/104, 118, 154, 167, 254; 348/42, 348/43, 48, 49
See application file for complete search history.

(56) References Cited

U.S. PATENT DOCUMENTS

| | | | | |
|---|---|---|---|---|
| 5,581,638 A * | 12/1996 | Givens et al. | ................. | 382/294 |
| 5,727,078 A * | 3/1998 | Chupeau | ....................... | 382/154 |
| 6,011,863 A * | 1/2000 | Roy | .............................. | 382/154 |
| 6,417,880 B1 * | 7/2002 | Uomori et al. | .................... | 348/42 |
| 6,567,682 B1 * | 5/2003 | Osterweil et al. | ............. | 600/407 |
| 6,862,364 B1 * | 3/2005 | Berestov | ....................... | 382/132 |
| 7,113,632 B2 | 9/2006 | Lee et al. | | |
| 7,386,164 B2 * | 6/2008 | Shragai et al. | ................ | 382/154 |
| 7,508,982 B2 * | 3/2009 | Tsuyuki et al. | ................ | 382/167 |
| 2001/0043739 A1 * | 11/2001 | Oshino et al. | .................. | 382/154 |

(Continued)

*Primary Examiner* — Vu Le
*Assistant Examiner* — Aklilu Woldemariam

(57) ABSTRACT

An apparatus for correcting a stereoscopic image using matching information, includes: a matching information visualizer receiving input of original stereoscopic images and intuitive matching information and visualizing a pair of stereoscopic images based on the intuitive matching information; a correction information processor obtaining a statistical camera parameter based on the intuitive matching information and correcting the received stereoscopic image using the statistical camera parameter; and an error allowable controller providing allowable error information to the correction information processor in consideration of an error allowable degree according to a selected time from the received intuitive matching information and preset human factor guide information, to extract a correlation between stereoscopic images using a stereoscopic image and provided information, thereby helping such that an erroneously photographed image is correctly photographed or correcting the image such that the erroneously photographed image is correctly interpreted, which leads to minimization of visual fatigue.

7 Claims, 3 Drawing Sheets

(56) References Cited

U.S. PATENT DOCUMENTS

| | | | |
|---|---|---|---|
| 2001/0045979 A1* | 11/2001 | Matsumoto et al. ............ 348/43 |
| 2002/0024592 A1* | 2/2002 | Uomori et al. .................. 348/42 |
| 2003/0156751 A1* | 8/2003 | Lee et al. ...................... 382/154 |
| 2003/0169918 A1* | 9/2003 | Sogawa ......................... 382/154 |
| 2004/0264764 A1* | 12/2004 | Kochi et al. .................. 382/154 |
| 2005/0002544 A1* | 1/2005 | Winter et al. ................. 382/104 |
| 2005/0036673 A1 | 2/2005 | Ohba et al. |
| 2005/0046700 A1* | 3/2005 | Bracke ...................... 348/218.1 |
| 2005/0129325 A1* | 6/2005 | Wu ................................ 382/254 |
| 2006/0082644 A1* | 4/2006 | Tsubaki .......................... 348/42 |
| 2006/0239537 A1* | 10/2006 | Shragai et al. ................ 382/154 |
| 2007/0003134 A1* | 1/2007 | Song et al. .................... 382/154 |
| 2007/0098230 A1* | 5/2007 | Norita et al. .................. 382/118 |
| 2007/0165304 A1* | 7/2007 | Tomita .......................... 359/464 |
| 2009/0022393 A1* | 1/2009 | Bar-Zohar et al. ............ 382/154 |
| 2009/0116732 A1* | 5/2009 | Zhou et al. .................... 382/154 |
| 2011/0025825 A1* | 2/2011 | McNamer et al. .............. 348/46 |
| 2011/0085027 A1 | 4/2011 | Yamashita et al. |

\* cited by examiner (a)   (b)   (c)

APPARATUS AND METHOD FOR CORRECTING STEREOSCOPIC IMAGE USING MATCHING INFORMATION

CROSS-REFERENCE TO RELATED APPLICATIONS

This application claimed priority to and the benefit of Korean Patent Application No. 10-2011-0103669 filed in the Korean Intellectual Property Office on Oct. 11, 2011, the entire contents of which are incorporated herein by reference.

TECHNICAL FIELD

The present invention relates to an apparatus and a method for correcting a stereoscopic image using matching information.

BACKGROUND ART

In order to interpret a stereoscopic image, information such as a size, a focus distance, or the like of an image sensor of a photographic camera, which is capable of geometrically interpreting a photographed image, is required such that an image is exactly interpreted. However, it is not easy to equally record photographed information changed according to a zoom value using a zoom lens every time, if there is no information capable of exactly interpreting the image from a plurality of images or the image cannot be interpreted in some cases, there have been limitations on correcting the stereoscopic image.

In particular, when processing a general nature image by an automatic matching information acquiring method between images used in a computer vision and the like, there are a plurality of cases where the image is not exactly processed. The reason is because a human collectively determines variation between objects, color variation, and the like in an image variation, whereas it is difficult to model image variation recognition of the human using a computer. Thus, when an image cannot be exactly interpreted, there are a plurality of cases that include interaction determined by the human.

"Method of and Apparatus for Rectifying a Stereoscopic Image" (referred to as "cited reference 1" hereinafter) suggested by Lelman Lee and Graham Roger states an existing processing method in detail that corresponding relationship (matching relationship between characteristic points) is detected and a camera parameter is statistically obtained, the obtained camera parameter is processed in a computer vision converting an image using relation information and image processing. However, cited reference 1 does not disclose a method where a corresponding relation cannot be obtained using an existing manner.

"Image Processing Device and Method, and Program" (referred to as "cited reference 2" hereinafter) suggested by Noriyuki Yamashita, et al. aimed at performing movement detection, coordinate calculation, generation of moving target information, and the like for a main target, and generating a 3D panorama image through image correction.

"Image Processing System, Program, Information Storage Medium, and Image Processing Method" (referred to as "cited reference 3" hereinafter) suggested by Yasuo Ohba et al. aimed at dividing an image region and generating and synthesizing a stereoscopic image through a texture mapping without distortion due to perspective to perform polygon mapping based on texture coordinates.

"Apparatus and method for displaying three-dimensional distortionless image" describes both of transmission and reception sides of a stereoscopic image, and aimed at presenting an optimal combined image displaying method through time difference correction and combination performing and viewing distance calculation.

"Transformation correction method and system of a stereoscopic image" is aimed at correcting movement of a subject or enlargement and reduction photographing according to a left/right camera ratio to improve the quality of a stereoscopic image.

The aforementioned methods suggest a method for improving the quality of a stereoscopic image according to the objects and methods. Although the method is presented on the assumption that fundamental information capable of interpreting a stereoscopic image is presented, the method is not presented when information capable of interpreting the stereoscopic image is insufficient or absent.

That is, there is a large need for a stereoscopic image with stereoscopic 3D for obtaining actuality from movies, games, music videos, advertisements using a large amount of digital contents. However, a stereoscopic image is not capable of minimizing complexity while manufacturing the stereoscopic image or a visual fatigue element that occurs from a manufactured image is manufactured. In particular, because a method of acquiring a right stereoscopic image or a correction method through a right stereoscopic image integrated with respect to an acquired image whose information is lack is insufficient, it is difficult to manufacture a stereoscopic image due to increase in a manufacturing cost of the stereoscopic image.

SUMMARY OF THE INVENTION

The present invention has been made in an effort to provide an apparatus and a method for correcting an erroneously photographed image using previously known information and a photographed stereoscopic image although there is insufficient or no information to integrate a stereoscopic image.

Another technical subject or advantages of the present invention will be described below, and is more clearly suggested with reference to exemplary embodiments. Technical subjects and advantages of the present invention may also be realized by means and a combination thereof described in the claims.

An exemplary embodiment of the present invention provides an apparatus for correcting a stereoscopic image using matching information, including: a matching information visualizer receiving input of original stereoscopic images and intuitive matching information and visualizing a pair of the stereoscopic images based on the intuitive matching information; a correction information processor obtaining a statistical camera parameter based on the intuitive matching information and correcting the received stereoscopic image using the statistical camera parameter; and an error allowable controller providing allowable error information to the correction information processor in consideration of an error allowable degree according to a selected time from the received intuitive matching information and preset human factor guide information.

The correction information processor may correct the original stereoscopic image in consideration of a visual fatigue degree according to an error and a time length of the received matching information using the human factor guide information.

The matching information visualizer may visualize a pair of stereoscopic images using the original stereoscopic image while photographing or an original stereoscopic image during a post-production but after photographing.

The matching information visualizer may include: a matching point information processing unit providing matching points simultaneously existing in the pair of stereoscopic images on the original stereoscopic image; a matching line information processor connecting the two matching points to each other, and providing information according to a length of the two connected matching points or matching line information stored in an object information processor; and a matching region information processor assisting input/output of intuitive matching region information using three-dimensional model information with respect to a standard object stored in the object information processor.

Another exemplary embodiment provides a method for correcting a stereoscopic image using matching information, including: receiving input of original stereoscopic images; receiving input of intuitive matching information and processing the intuitive matching information for visualizing a pair of stereoscopic images based on the intuitive matching information; correcting the stereoscopic image using control information with respect to a time and an error according to guide information for minimizing visual fatigue.

The processing of the intuitive matching information may include categorizing object information according to a frequency of contents used in the stereoscopic image, and separately storing object information in the same category to receive provision of matching information with a help of a step of processing the object information.

The correcting of the stereoscopic image may include correcting the stereoscopic image by changing a stereoscopic camera parameter including transformation and physical moving information of an image upon stereo photographing.

The correcting of the stereoscopic image may include correcting the original stereoscopic image in consideration of a visual fatigue degree according to an error and a time length of the received matching information using the human factor guide information.

The processing of the intuitive matching information may include processing matching point information providing matching points simultaneously existing in the pair of stereoscopic images on the original stereoscopic image.

The processing of the intuitive matching information may further include processing matching line information connecting the two matching points to each other, and providing information according to a length of the two connected matching points or matching line information stored in an object information processor.

The processing of the intuitive matching information may further include processing matching region information assisting input/output of intuitive matching region information using three-dimensional model information with respect to a standard object stored in the object information processor.

Since an apparatus and a method for correcting an image according to exemplary embodiments of the present invention may additionally provide matched information to correct a stereoscopic image causing visual fatigue, thereby minimizing the visual fatigue, the apparatus and the method are applicable to a general stereoscopic image.

The apparatus and the method for correcting an image according to exemplary embodiments of the present invention may develop a system that may provide easily providable matching information such that a difficult visual fatigue phenomenon is minimized upon manufacturing a stereoscopic image to correct an image, which lead to reduction of manufacturing cost in a stereoscopic image.

In the apparatus and the method for correcting an image according to exemplary embodiments of the present invention, a stereoscopic image manufacturing technology where visual fatigue is minimized is applicable to various fields such as stereoscopic movies, games, advertisements, and scientific visualization.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
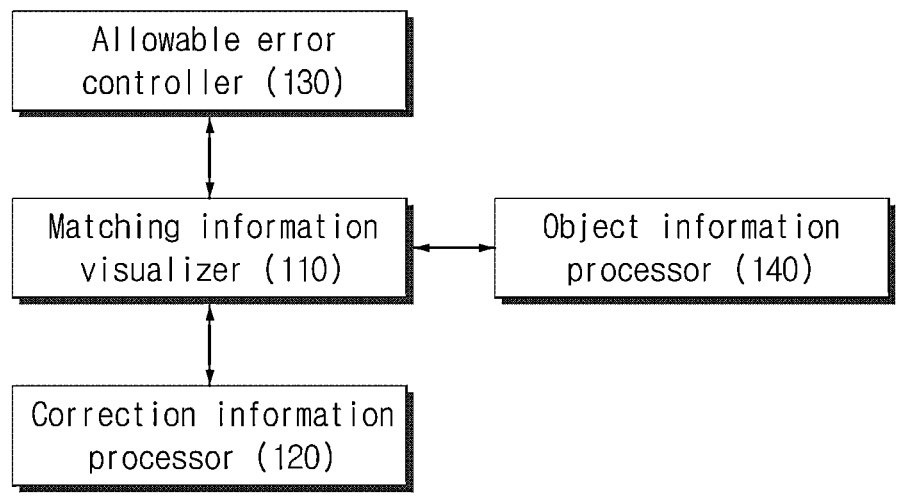
FIG. 1 is a block diagram illustrating a configuration of an apparatus for correcting a stereoscopic image according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. In describing the present invention, well-known functions or constructions will not be described in detail since they may unnecessarily obscure the understanding of the present invention. It should be understood that although exemplary embodiment of the present invention are described hereafter, the spirit of the present invention is not limited thereto and may be changed and modified in various ways by those skilled in the art.

Exemplary embodiments of the present invention provide a method for correcting an image that adds information regarding a previously existing object or matching information due to determined by a human to an image in which interpretation with a stereoscopic image due to insufficient information with respect to an image or complexity of the image may be incorrectly processed by a computer vision processing, which may be widely used in fields that are not disclosed in the related art.

An object of the present invention is to provide matching information capable of being easily provided such that a difficult visual fatigue phenomenon upon manufacturing a stereoscopic image is minimized to develop a system for correcting the stereoscopic image, to solve a problem upon manufacturing the stereoscopic image and to help manufacturing more stereoscopic image contents. A stereoscopic image manufacturing technology whose visual fatigue is minimized is applicable to various fields such as stereoscopic movies, games, advertisements, and scientific visualization.

An exemplary embodiment of the present invention discloses an image manufacturing method and a used example thereof having a difficulty in accurately interpreting a stereoscopic when information with respect to photographing equipment and information with respect to an environment are insufficient, including a technology of easily providing a corresponding pair of matching information of a stereoscopic image while photographing or an acquired stereoscopic image, a technology of interpreting a stereoscopic image from the information, and a technology of correcting an error of the stereoscopic image to minimize visual fatigue.

Parts configuring an exemplary embodiment of the present invention are similar to partial methods of the related art.

However, the greatest characteristic of the elements represents a method for manufacturing a stereoscopic image to minimize visual fatigue by performing matching information input and visualization, provision of intuitive addition information using an object DB, adjusting an allowable degree between time/error with an error of additional information and a visual fatigue.

As used in this exemplary embodiment, the term "intuitive matching information" and "human factor" have the following meanings.

The intuitive matching information may refer to information corresponding to an object in an image to interpret an image, and information capable of easily knowing characteristics of an object in a stereoscopic image may include intersecting corners between object boundaries, lines forming the boundaries, and boundary regions themselves. A characteristic of an object commonly appearing from a pair of stereoscopic images may be input as matching information, and a corresponding relationship between matching information in each image may be integrated to obtain a camera parameter, and a stereoscopic image may be corrected using the camera parameter. As a method of inputting information, an input device such as a mouse, a touch screen, a pen, or the like may be used and input errors may be considered according to accuracy of the input device.

The human factor is used to refer to consider a factor associated with a stereoscopic image generating visual fatigue or a headache to a human unlike a real environment when viewing the stereoscopic image.

As one method of visualizing matching information, there may be an image overlay manner, which means a manner of displaying matching information in an overlay layer on an original image to simultaneously output the original image and the matching information.

Hereinafter, an exemplary embodiment according to the present invention will be described in detail with reference to the accompanying drawings as follows.

Figure 4:
FIG. 4 is a diagram illustrating an example of intuitive matching information used according to an exemplary embodiment of the present invention.

FIG. 1 is a block diagram illustrating a configuration of an apparatus for correcting an image according to an exemplary embodiment of the present invention, FIG. 4 is a diagram illustrating an example of intuitive matching information according to an exemplary embodiment of the present invention, and FIGS. 5A to 5C show a diagram illustrating examples of an original image, input intuitive matching information, and an output visual image, respectively.

Referring to FIG. 1, and FIGS. 4 to 5C, an apparatus for connecting a stereoscopic image according to an exemplary embodiment of the present invention may include a matching information visualizer 110, a correction information processor 120, and an allowable error controller 130, and preferably include an object information processor 140.

In more detail, the matching information visualizer 110 functions to receive input of intuitive matching information and to visualize the intuitive matching information on a target image to be processed. The intuitive matching information may be input through various input means such as a mouse, a touch, a pen, and the like, and input errors may be considered according to accuracy of the input means.

Figure 5:
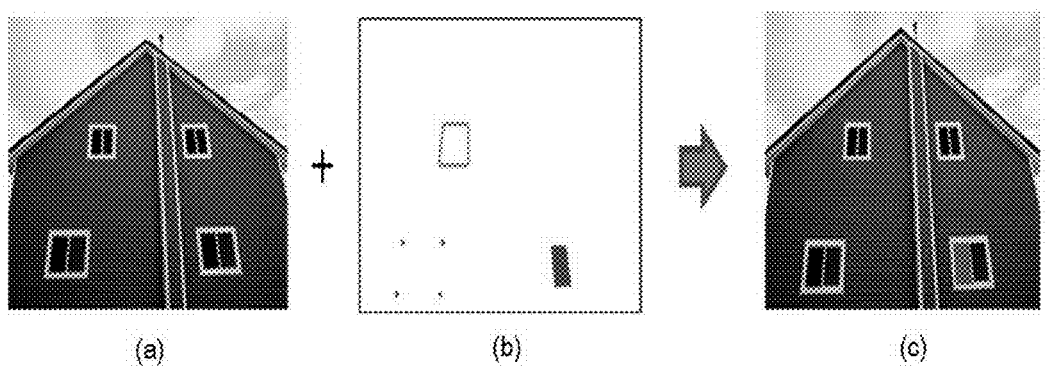
FIGS. 5A to 5C are a diagram illustrating examples of an original image, input intuitive matching information, and an output visual image, respectively.

Referring to FIG. 4, the intuitive matching information may be expressed as a red point of a corner (left lower window frame) indicating a tetragon being a shape of a window frame, a red line (left upper window frame) appearing along a boundary of the window frame, and a red region (right lower window) indicating a window in the window frame. Referring to FIG. 5, as one example, visualization on the target image may be expressed by inputting middle intuitive matching information to an overlayer of a far left original image to output an image of a top right image.

The object information processor 140 may include an object database, and the object database is a device of supporting input of the intuitive matching information.

The information stored in the object database may be standard information or specific information with respect to shape information, size information, or the like of vehicles, cups, trees, buildings, and the like present in an existing daily life, and information searched from the object database may be visualized in an intuitive scheme such as selection/correction/arrangement. A user may additionally store and search the information using an object information processor 112. The object information processor 112 may include the standard size of three-dimensional model information, and provide enlargement/reduction functions.

The correction information processor 120 may process matching information provided by the foregoing manners in such a way that it obtains a statistic camera parameter using existing matching information described in the above mentioned Lelman Lee and Graham Roger, a computer vision book, or the like.

The allowable error controller 130 may provide an allowable error necessary for a procedure of obtaining a camera parameter, and differ from a base in that allowable error information is calculated and used according to a value input to the allowable error controller 130.

Here, as examples of a value input to the allowable error controller 130, there may be low precision processing/intermediate precision processing/high precision processing or high speed processing/intermediate speed processing/low speed processing as an allowable error value of a pixel or a relative value provided from a system.

Figure 2:
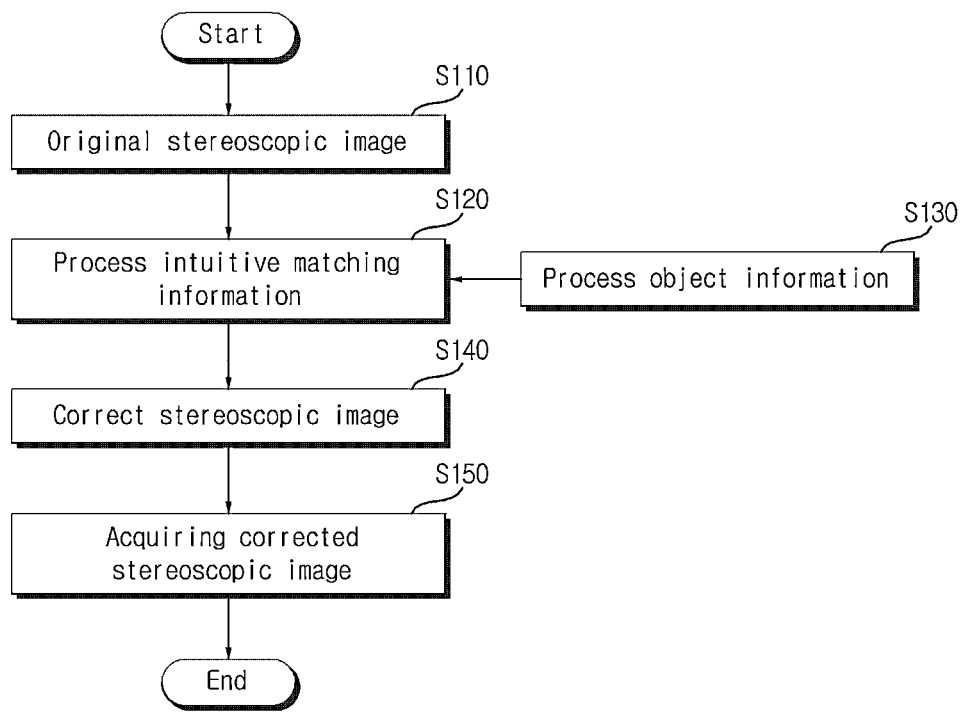
FIG. 2 is a flowchart illustrating a method for correcting a stereoscopic image according to an exemplary embodiment of the present invention.
Figure 3:
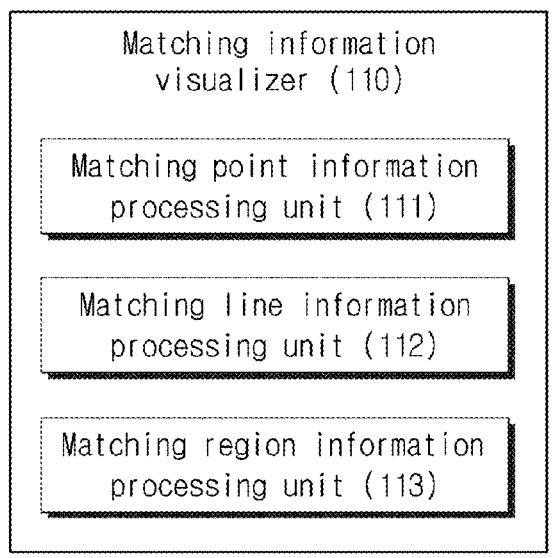
FIG. 3 is a block diagram illustrating a detailed configuration of a matching information visualizer according to an exemplary embodiment of the present invention.

FIG. 2 is a flowchart illustrating a method for correcting an image according to an exemplary embodiment of the present invention, and FIG. 3 is a block diagram illustrating a detailed configuration of a matching information visualizer according to an exemplary embodiment of the present invention.

Referring to FIGS. 2 and 3, the method for correcting an image according to an exemplary embodiment of the present invention includes inputting an original stereoscopic image (S110), processing intuitive matching information (S120), processing object information (S130), correcting a stereoscopic image (S140), and acquiring the corrected stereoscopic image (S150).

First, a matching information visualizer 110 receives input of the original stereoscopic image (S110). The original stereoscopic image may be an image during a photographing procedure, or an input stereoscopic image for performing post-production after an object is photographed. The great difference between an image during a photographing procedure and an input image in a post-production is that real-time is required for the image during a photographing procedure, whereas accuracy is required in the image during the post-production.

The processing of the intuitive matching information (S120) is a procedure of visualizing a pair of stereoscopic images and providing information used from the matching information visualizer 110 on the visualized pair of the stereoscopic images. The provided used information is configured to visualize an image such that a user may directly confirm the visualized image in an operation procedure, and allowable error information is displayed such that input correction is impossible.

The processing of the object information (S130) provides size and shape information of conventional objects such as vehicles, building, trees, human, and the like capable of being an existing DB to assist intuitive input/output.

Since the object information is information widely used for stereoscopic image contents, categorized and configured, stored by automatically calculating information such as an average size, a deviation, or the like of an object in the same category, it may be presented in case of need. In some cases, information that a user frequently uses may be stored such that the user can access it separately and easily.

The correcting of the stereoscopic image (S140) is basically the same as correction of an image in a case where existing matching information disclosed in cited reference 1 is provided. In the correcting of the stereoscopic image (S140), if control guide information with respect to time/error minimizing visual fatigue is provided, what is different from the existing manner is an aspect of performing image correction using the provided control guide information.

As described above, if steps S110 to S140 are performed, in the step of acquiring the corrected stereoscopic image (S150), a stereoscopic image processed such that visual fatigue is minimized may be manufactured. In particular, a stereoscopic camera parameter photographed during an image photographing procedure may be changed to acquire a corrected stereoscopic image through correction of the stereoscopic image. If the stereoscopic camera parameter cannot be changed, that is, when the stereoscopic camera parameter is identical with an existing camera parameter, a corrected stereoscopic image through image conversion is acquired. Here, change of the stereoscopic camera parameter refers to physical and geometrical change of a stereoscopic camera, the existing camera parameter refers to a camera parameter setting value when the acquired image is photographed, and the image conversion refers to conversion of image data (pixel color value due to variation in location) according to the acquired camera parameter unlike the existing camera parameter.

Referring to FIG. 3, the matching information visualizer 110 includes a matching point information processing unit 111, a matching line information processing unit 112, and a matching region information processing unit 113.

The matching point information processing unit 111 provides matching point information capable of being easily characterized like corners of an object or an end of a boundary on an original image to a user according to input as matching points simultaneously existing in a pair of stereoscopic images. If matching information directly input by the user or information selected from the object information processor 140 is provided on one side image (e.g., the left of a stereoscopic image), the matching point information processing unit 111 searches a current matching location suited to setting of a camera and displays another side image (e.g., the right of the stereoscopic image) forming one pair together with the one side image. If the display image corresponds to the matching information, it does not matter. If the display image does not correspond to the matching information, the matching information may be corrected by the matching point information processing unit 111, and input information and matching point information thereof are used for correcting the image.

In the same manner as in the matching point information, the matching line information processing unit 112 inputs and visualizes information. A line processing is more useful than a point processing. Because matching line information contains connection information of two points, a user may directly provide length information thereof and use information in an existing DB. Upon initially setting a camera, line information may be provided to images, respectively, to previously correct a distortion degree of a camera. Particularly, it is difficult to receive an image for correcting distortion of the camera during a photographing procedure as an original image, there is a need for distorting and visualizing a matching line suited to distortion information of the camera. When a linear editing is not performed in a post-production, there is a demand to distort and visualize the matching line. If there is no camera distortion information in camera information provided with the original image, the distortion information of a camera with respect to a pair of images is obtained by the above mentioned method and is applicable to an image later. Because a case where an agreement between a matching line of applying distortion information and a line on an image is low is a case where camera distortion information such as camera zoom is not suited, the image needs to be newly obtained using the foregoing method.

The matching region information processing unit 113 may input and visualize matching region information similar to an input and visualizing method of the matching point information or the matching line information, and particularly, assist input of intuitive matching region information using three-dimensional model information with respect to a standard object of an object database (DB) system. The selected three-dimensional model information in the object database (DB) system may be selected/arranged in a corresponding space, and enlarged/reduced according to change in the size to be visualized.

The matching information as illustrated above is input/output visualized according to selection upon its input, and image correction is achieved according to input information. However, when a corrected result does not reach a desired level, additional matching information may be provided. The input visualized matching information is not stored in the corrected stereoscopic image, but may be separately or simultaneously in a certain case.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claimed which follow.

What is claimed is:

1. An apparatus for correcting a stereoscopic image using matching information, comprising:
   a matching information visualizer receiving input of original stereoscopic images and intuitive matching information and visualizing a pair of stereoscopic images based on the intuitive matching information;
   an object information processor processing the intuitive matching information by processing matching point information for matching points that simultaneously exist in the pair of stereoscopic images of the original stereoscopic images;
   a correction information processor obtaining a statistical camera parameter based on the intuitive matching information and correcting the received stereoscopic image using the statistical camera parameter in consideration of a visual fatigue degree according to an error and a time length of the received matching information using preset human factor guide information; and
   an error allowable controller providing allowable error information to the correction information processor in consideration of an allowable degree of error of a pixel or a relative value according to a time associated with the received intuitive matching information and the preset human factor guide information, wherein the intuitive matching information is information corresponding to geometric attributes of an object in an image that is input by a user.

2. The apparatus of claim 1, wherein the matching information visualizer includes:
   a matching point information processing unit providing matching points in the pair of stereoscopic images and on the original stereoscopic image;
   a matching line information processor connecting the matching points to each other, and providing information according to a length of the two connected matching points or matching line information stored in an object information processor; and
   a matching region information processor assisting input and output of intuitive matching region information using three-dimensional model information with respect to a standard object stored in the object information processor.

3. A computer implemented method for correcting a stereoscopic image using matching information and performed by a processor of the computer, the method comprising:
   receiving input of original stereoscopic images;
   receiving input of intuitive matching information;
   processing the intuitive matching information for visualizing a pair of the stereoscopic images based on the intuitive matching information; and
   correcting the stereoscopic image using control information with respect to a time and a degree of error according to guide information for minimizing visual fatigue,
   wherein the intuitive matching information is information corresponding to geometric attributes of an object in an image that is input by a user,
   wherein processing of the intuitive matching information includes processing matching point information for matching points simultaneously existing in the pair of stereoscopic images on the original stereoscopic image, and
   wherein correcting the stereoscopic image includes correcting the original stereoscopic image in consideration of a visual fatigue degree according to an error of a pixel or a relative value and a time length of the received matching information using the human factor guide information.

4. The method of claim 3, wherein processing the intuitive matching information includes categorizing object information according to a frequency of contents in the stereoscopic image, and separately storing object information in the same category.

5. The method of claim 3, wherein correcting the stereoscopic image further includes changing a stereoscopic camera parameter including transformation and physical movement information.

6. The method of claim 3, wherein processing the intuitive matching information further includes processing matching line information with respect to a line connecting two matching points, and providing information according to a length of the line connecting two matching points or matching line information stored in an object information processor.

7. The method of claim 6, wherein processing the intuitive matching information further includes processing matching region information assisting input and output of intuitive matching region information using three-dimensional model information with respect to a standard object stored in the object information processor.

* * * * *